(12) United States Patent
Uemura et al.

(10) Patent No.: US 10,656,653 B2
(45) Date of Patent: May 19, 2020

(54) WORK AREA DETERMINATION SYSTEM FOR AUTONOMOUS TRAVELING WORK VEHICLE, THE AUTONOMOUS TRAVELING WORK VEHICLE AND WORK AREA DETERMINATION PROGRAM

(71) Applicant: Kubota Corporation, Osaka-shi (JP)

(72) Inventors: Katsuhiko Uemura, Sakai (JP); Hitoshi Aoyama, Sakai (JP); Hideya Umemoto, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/993,917

(22) Filed: May 31, 2018

(65) Prior Publication Data

US 2019/0113928 A1 Apr. 18, 2019

(30) Foreign Application Priority Data

Oct. 18, 2017 (JP) .................................. 2017-202144

(51) Int. Cl.
*G05D 1/02* (2020.01)
*G05D 1/00* (2006.01)
*B64C 39/02* (2006.01)

(52) U.S. Cl.
CPC ......... *G05D 1/0219* (2013.01); *B64C 39/024* (2013.01); *G05D 1/0088* (2013.01); *G05D 1/0094* (2013.01); *G05D 1/0251* (2013.01); *G05D 1/0274* (2013.01); *G05D 1/0278* (2013.01); *G05D 2201/0208* (2013.01)

(58) Field of Classification Search
CPC .. G05D 1/0219; G05D 1/0094; G05D 1/0274; G05D 1/0278; G05D 1/0251; G05D 1/0088; G05D 2201/0208; B64C 1/0088
See application file for complete search history.

(56) References Cited

U.S. PATENT DOCUMENTS

| | | | | |
|---|---|---|---|---|
| 2013/0162822 | A1* | 6/2013 | Lee | H04N 7/185 348/146 |
| 2014/0119716 | A1* | 5/2014 | Ohtomo | G01C 11/00 396/8 |
| 2014/0316614 | A1* | 10/2014 | Newman | G06Q 30/0611 701/3 |
| 2017/0015416 | A1* | 1/2017 | O'Connor | B64C 39/024 |

(Continued)

FOREIGN PATENT DOCUMENTS

| | | |
|---|---|---|
| JP | 2013164742 A | 8/2013 |
| JP | 201610382 A | 1/2016 |
| WO | 2015142166 A1 | 9/2015 |

*Primary Examiner* — Thomas Ingram
(74) *Attorney, Agent, or Firm* — The Webb Law Firm

(57) ABSTRACT

A work area determination system for an autonomous traveling work vehicle includes a photographing device for photographing a predetermined area including a work area and acquiring a photographic image thereof, a positioning device for obtaining position information indicative of a position at which the photographic image has been acquired, a map generation section for generating a map based on the photographic image and the position information, a displaying section for displaying the map, and a work area determination section for determining the work area in which the autonomous traveling work vehicle is to work, based on an area designation for the map displayed in the displaying section.

6 Claims, 2 Drawing Sheets

(56) References Cited

U.S. PATENT DOCUMENTS

2017/0083024 A1* 3/2017 Reijersen Van Buuren ................ A01B 69/001
2017/0127606 A1* 5/2017 Horton .................... A01C 5/06

* cited by examiner

WORK AREA DETERMINATION SYSTEM FOR AUTONOMOUS TRAVELING WORK VEHICLE, THE AUTONOMOUS TRAVELING WORK VEHICLE AND WORK AREA DETERMINATION PROGRAM

CROSS-REFERENCE TO RELATED APPLICATION

This application claims priority to Japanese Patent Application No. 2017-202144 filed Oct. 18, 2017, the disclosure of which is hereby incorporated in its entirety by reference.

BACKGROUND OF THE INVENTION

Field of the Invention

The present invention relates to a work area determination system for an autonomous traveling work vehicle, the autonomous traveling work vehicle and also to a work area determination program.

Description of Related Art

In recent years, an autonomous traveling work vehicle for maintaining a field such as a garden, a park, etc. in an autonomous manner has been gaining popularity. In order for the autonomous traveling work vehicle to carry out a work autonomously, it is necessary for this autonomous traveling work vehicle per se to be able to recognize an area in which the work is to be done.

As a method for causing an autonomous traveling work vehicle to recognize a work area, e.g. Japanese Unexamined Patent Application Publication No. 2013-164742 (Patent Document 1) proposes a method by which a work area is predefined by installing in advance an area wire along an outer edge of the area where the work is to be done within a field. According to this method, when the autonomous traveling work vehicle, by a magnetic sensor mounted thereon, detects a magnetic field generated by the area wire, the vehicle per se recognizes that it has reached an end of an area where the work is to be done and effects a turn. With this, it is possible to allow the autonomous traveling work vehicle to effect the work only within the area where the wire was installed in advance.

As a further method, e.g. Japanese Unexamined Patent Application Publication No. 2016-10382 (Patent Document 2) proposes a method by which a border reporting means using a fence, wireless arrangement, light, etc. is disposed. With this method too, it is possible to cause the autonomous traveling work vehicle to recognize an area where a work is to be done.

SUMMARY OF THE INVENTION

Problem to be Solved by Invention

Incidentally, in the case of such techniques as those disclosed in Patent Documents 1, 2 above, it is necessary to install in advance a border reporting means such as a fence, wireless arrangement, light, etc. Such method requiring installing border reporting means in advance can be troublesome in the installment. Further, there was another problem that a work is possible only in a field where the border reporting means has been installed in advance. Moreover, when an autonomous traveling work vehicle is to be introduced, the border reporting means needs to be installed. So, the introduction cost can be high.

Then, there is a need for a work area determination system for an autonomous traveling work vehicle, the autonomous traveling work vehicle and also to a work area determination program, which can reduce the burden of installing the border reporting means in advance.

Solution

According to the present invention, a work area determination system for an autonomous traveling work vehicle, comprising:

a photographing device for photographing a predetermined area including a work area and acquiring a photographic image thereof;

a positioning device for obtaining position information indicative of a position at which the photographic image has been acquired;

a map generation section for generating a map based on the photographic image and the position information;

a displaying section for displaying the map; and a work area determination section for determining the work area in which the autonomous traveling work vehicle is to work, based on an area designation for the map displayed in the displaying section.

Further, according to the present invention, an autonomous traveling work vehicle comprises:

a traveling vehicle body;

a positioning device for acquiring self-vehicle position information indicative of a self-vehicle position;

a work area information acquisition section for acquiring work area information indicative of a work area; and a traveling control section for controlling traveling of the traveling vehicle body based on the self-vehicle position information and the work area information such that the traveling vehicle body travels within the work area;

wherein the work area information acquisition section acquires the work area information determined by an area designation for a map generated based on a photographic image of a predetermined area including the work area and position information indicative of a position at which the photographic image has been acquired.

Further, according to the present invention, a work area determination program for an autonomous traveling work vehicle, the program being executed by a terminal control section, the program comprising:

an image acquisition function for acquiring a photographic image photographed by a photographing device of a predetermined area including a work area;

a photographing position acquisition function for acquiring position information indicative of a position where the photographic image was acquired;

a map generation function for generating a map based on the photographic image and the position information;

a displaying function for displaying the map in a displaying section; and a work area determination function for determining the work area where the autonomous traveling work vehicle is to work, based on an area designation for the map displayed by the displaying function.

With these arrangements, a work area where the autonomous traveling work vehicle is to work can be determined without needing to install a border reporting means in advance. So, the cost and/or trouble for introducing an autonomous traveling work vehicle can be reduced.

Next, preferred embodiments of the present invention will be explained. It is understood however that the scope of the invention is not limited by the following preferred embodiments.

According to a preferred embodiment of the work area determination system for an autonomous traveling work vehicle, the map generation section generates the map by synthesizing a plurality of photographic images based on an index contained in the photographic images.

With this arrangement, an image can be synthesized with reference to indices shown in the photographic images, so accuracy of the map to be generated can be enhanced.

According to a preferred embodiment of the work area determination system for an autonomous traveling work vehicle, the photographing device includes a slope sensor, and slope information of the photographing device at the time of photographing of the photographic image is added to the photographic image.

With this arrangement, a photographing angle at the time of photographing of each photographic image can be referred to at the time of map generation, so accuracy of the map to be generated can be enhanced.

According to a preferred embodiment of the work area determination system for an autonomous traveling work vehicle, the system further comprises an unmanned flying body; and the photographing device and the positioning device are mounted on the unmanned flying body.

With this arrangement, since the map can be generated based on photographic images overlooked from the sky, accuracy of the map to be generated can be enhanced.

According to a preferred embodiment of the work area determination system for an autonomous traveling work vehicle, the system further comprises an elongate stick member; and the photographing device and the positioning device are mounted on the elongate stick member.

With this arrangement, since the map can be generated based on photographic images overlooked from a high position, accuracy of the map to be generated can be enhanced.

Further and other features and advantages of the present invention will become apparent upon reading following explanation of exemplary and non-limiting embodiments with reference to the accompanying drawings.

EMBODIMENTS

First Embodiment

Figure 1:
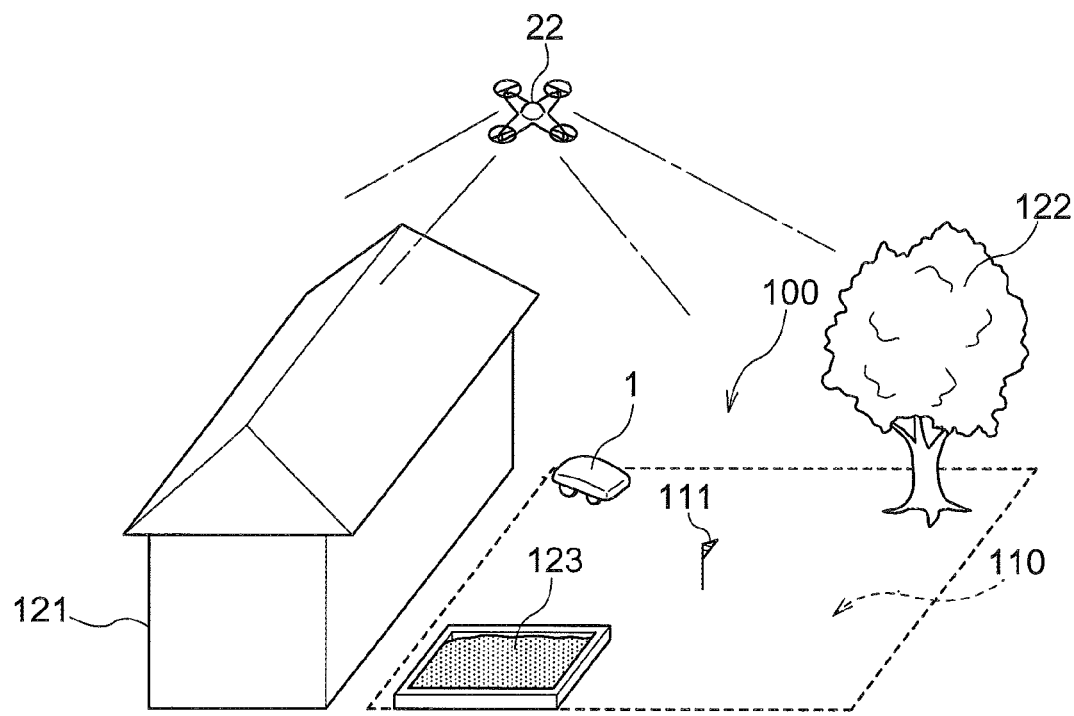
FIG. 1 is a schematic view showing a first embodiment of a work area determination system relating to the present invention.

A first embodiment of an inventive work area determination system for an autonomous traveling work vehicle will be explained with reference to the accompanying drawings.

In this embodiment, there will be explained an example in which the inventive work area determination system for an autonomous traveling work vehicle is applied to a work area determination system for an autonomous traveling grass mower 1. Incidentally, in the following explanation, a global positioning system will be referred to as "GPS".

In this embodiment, for a field 100, a work area 110 in which the autonomous traveling grass mower 1 is to effect grass cutting work is determined. The autonomous traveling grass mower 1 includes a grass mower control section 11, a traveling vehicle body 12, a grass cutting section 13, and a grass mower GPS 14 as a "positioning device". The grass mower control section 11 includes a work area information acquisition section 11a and a traveling control section lib. A work area determination system for determining the work area 110 includes an operational terminal 21, and a drone 22 as an "unmanned flying body". The autonomous traveling grass mower 1 and the drone 22 both can wirelessly communicate with the operational terminal 21 and these devices can be remotely controlled by the operational terminal 21.

The operational terminal 21 includes a terminal control section 211 and a touch panel 212 functioning as a "displaying section". The terminal control section 211 includes a map generation section 211a and a work area determination section 211b. Via the terminal control section 211 and the touch panel 212, the operational terminal 21 can provide information to a user and can also receive inputs from the user. Incidentally, as the operational terminal 21, a general purpose device such as a tablet terminal, a smart phone, etc. can be used or a dedicated device can be used also.

The drone 22 includes a drone control section 211, a camera 222 as a "photographing device", a drone GPS 223 as a "positioning device", and a slope sensor 224. The drone control section 221 includes an information acquisition section 221a and a flight control section 221b. The drone 22 can obtain a photographic image added with photographing position information and slope information.

The field 100 can contain a house (building) 121, a tree 122, and a flower bed 123 as "exclusions" which need to be excluded from the work area 110. In this embodiment, there will be explained an example of work area determination system for controlling the autonomous traveling grass mower 1, configured to determine the work area 110 included in such field 100 and to control the autonomous traveling grass mower 1.

For determination of the work area 110, firstly, a flag 111 (an example of "index") for assisting map generation is set at a desired location in the field 100. Preferably, this flag 111 should be set in such a manner as to allow easy removal thereof when needed. Next, a user will operate the drone 22 with using the operational terminal 21 to fly this drone 22 in the sky over the field 100. Upon arrival of the drone 22 at photographing position 101a, with using the operational terminal 21, a photographing instruction will be transmitted to the drone 22. Upon receipt of this photographing instruction, the drone 22 will acquire (capture) a photographic image by the camera 222. Simultaneously, photographing position information by the drone GPS 223 and slope information by the slope sensor 224 will be acquired and by combining these, there will be acquired a photographic image 3a added with the photographing position information and the slope information. Therefore, the drone 22 will transmit this photographic image 3a to the operational terminal 21.

After the reception of the photographic image 3a, the operational terminal 21 will be operated again to move the drone 22 to a position above a further photographing position 101b and to acquire a photographic image 3b, as done previously for the photographing position 101a described above. With repeated execution of the same process as above, photographic image 3c, 3d over still further photographing positions 101c, 101d will be acquired respectively and then, the drone 22 will be landed. Incidentally, the flag 111 may be removed after acquisition of all the photographic images 3a through 3d.

The map generation section 211a of the operational terminal 21 generates a map of the field 100 by synthesizing the photographic images 3a-3d. In this, the position of the flag 111 shown in the photographic images 3a through 3d, the respective photographing position information of the photographic images 3a-3d and the respective slope information of the photographic images 3a-3d are utilized as reference information for the synthesis. The resultant synthesized map will be displayed on the touch panel 212, so the user will operate this touch panel 212 to set the work area 110 on this map. The method of this setting can be e.g. moving a finger along the outer circumference of the area corresponding to the work area 110 in the map displayed on the touch panel 212. In this, the work area determination section 211b will automatically recognize positions of the house 121 and the tree 122 based on the photographic images 3a-3d and incorporate these into "exclusion areas". Further, for a location such as the flower bed 123 where automatic incorporation in the exclusion areas by the image recognition technique is difficult, this can be incorporated manually into the exclusion areas by a user's input.

Upon completion of setting of the work area 110, the operational terminal 21 will automatically set a traveling route for the autonomous traveling grass mower 1 and transmit this to the work area information acquisition section 11a of the autonomous traveling grass mower 1. When starting of a grass cutting work is instructed to the autonomous traveling grass mower 1 with using the operational terminal 21, the traveling control section lib will drive the traveling vehicle body 12 to guide the autonomous traveling grass mower 1 on the traveling route, based on current position information of the autonomous traveling grass mower 1 acquired with using the grass mower GPS 14. Then, the autonomous traveling grass mower 1 will travel on/along the traveling route and effect a grass cutting work at the same time by operating the grass cutting section 13. Upon completion of the grass cutting work for the entire work area 110, the autonomous traveling grass mower 1 will return to a charging station (device) and stop operation and start charging.

As described above, with the work area determination system for the autonomous traveling grass mower 1 according to this embodiment, for the determination of the work area 110 for the autonomous traveling grass mower 1, the trouble of installing a border reporting means in advance can be reduced.

Second Embodiment

Figure 4:
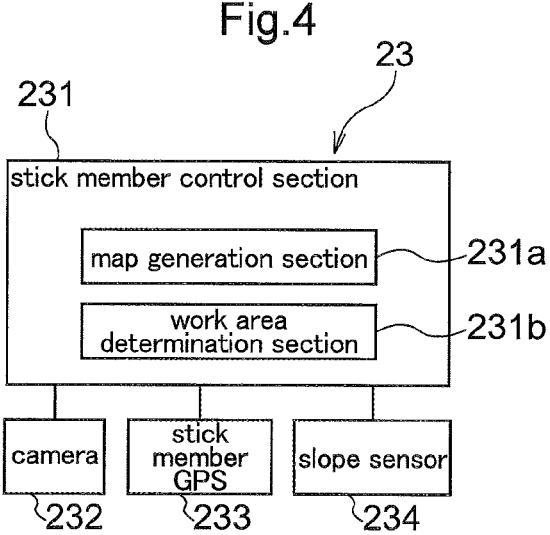
FIG. 4 is a view showing relationship among respective constituting elements in a second embodiment of the work area determination system relating to the present invention.

A second embodiment of an inventive work area determination system for an autonomous traveling work vehicle will be explained with reference to FIG. 4, etc. The work area determination system of this embodiment differs from the work area determination system of the first embodiment in that a stick member 23 is employed instead of the drone 22. The stick member 23 includes a stick member control section 213 and further includes, at its leading end portion, a camera 232, a stick member GPS 233 and a slope sensor 234. The stick member control section 231 includes a map generation section 231a and a work area determination section 231b. Like the drone 22, the stick member 23 can acquire a photographic image added with photographing position information and slope information. Next, the work area determination system for an autonomous traveling work vehicle according to this embodiment will be explained, mainly as regards the difference from the first embodiment. Incidentally, as regards those not explicitly described, such are understood to be identical to the first embodiment and will be denoted with like reference numerals/marks and detailed explanation thereof will be omitted.

In the first embodiment, the photographic images 3a-3d are acquired by flying the drone 22 over the field 100. In this embodiment, a user located at a desired location in the field 100 will put the stick member 23 having the camera 232, etc. over his/her head and acquire the photographic images 3a-3d overhead.

Other Embodiments

Lastly, other embodiments of the inventive work area determination system for an autonomous traveling work vehicle will be explained. Incidentally, the arrangements disclosed in the following respective embodiments can be used also in desired combination with the arrangements disclosed in the other embodiment(s), unless contradiction occurs.

In the foregoing embodiments, there were explained examples wherein the autonomous traveling grass mower 1 and the work area determination system are provided with respective GPS(s) separately. Alternatively, the unmanned flying body or the stick member can include a positioning device detachably, so that this positioning device can be detachably attached to the autonomous traveling work vehicle also.

In the foregoing embodiments, there were explained examples wherein the work area determination system is provided with either the drone 22 or the stick member 23. However, the invention it not limited to such arrangements. Any method which allows acquisition of a photographic image from a position allowing overlooking (bird's-eye-view) of the field may be used. For instance, a user who holds a unit having the photographing device and the positioning device may climb to a high location with using a footing such as a stepladder and acquire a photographic image from such high position on the footing.

In the foregoing embodiments, there were explained examples wherein the photographic images 3a-3d are synthesized with reference to the position of the flag 111 to generate a map. However, the invention it not limited to such arrangements. The form of index or its installment location can be set as desired. For instance, a string-like index may be installed on/along a borderline of the work area. Further alternatively, instead of providing such index as a flag, a stationary object such as a house or a tree, etc. can be utilized as an index.

Figure 2:
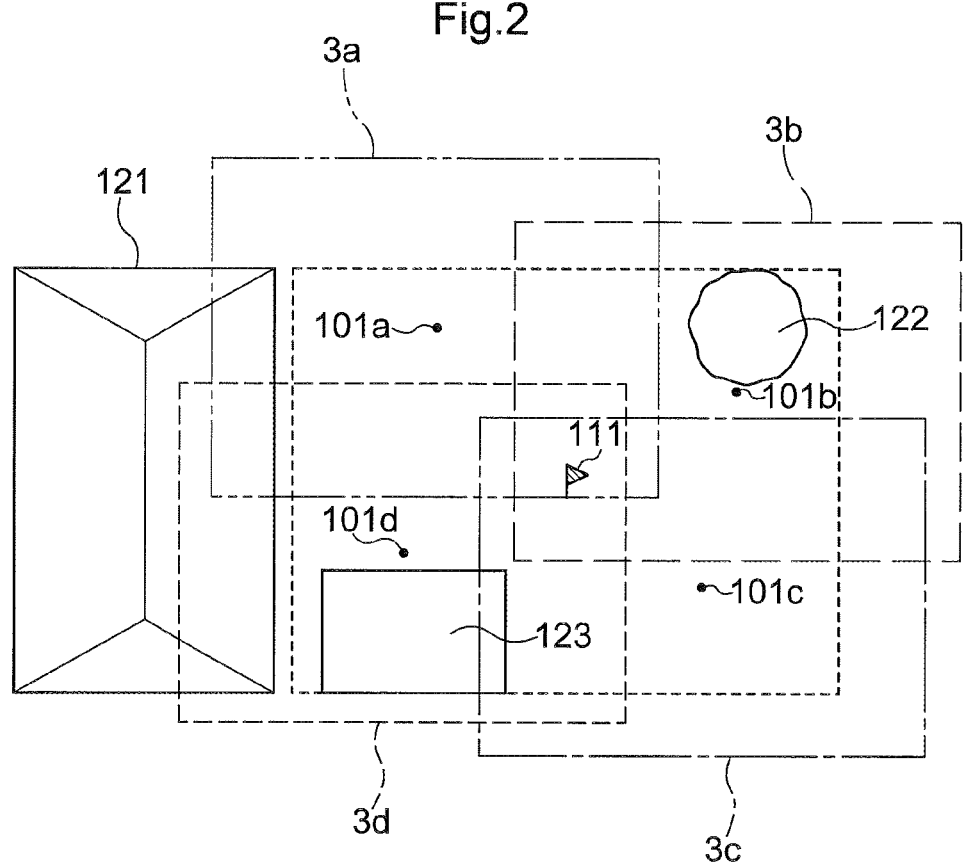
FIG. 2 is a schematic view showing photographic image synthesis in the first embodiment of the work area determination system relating to the present invention.
Figure 3:
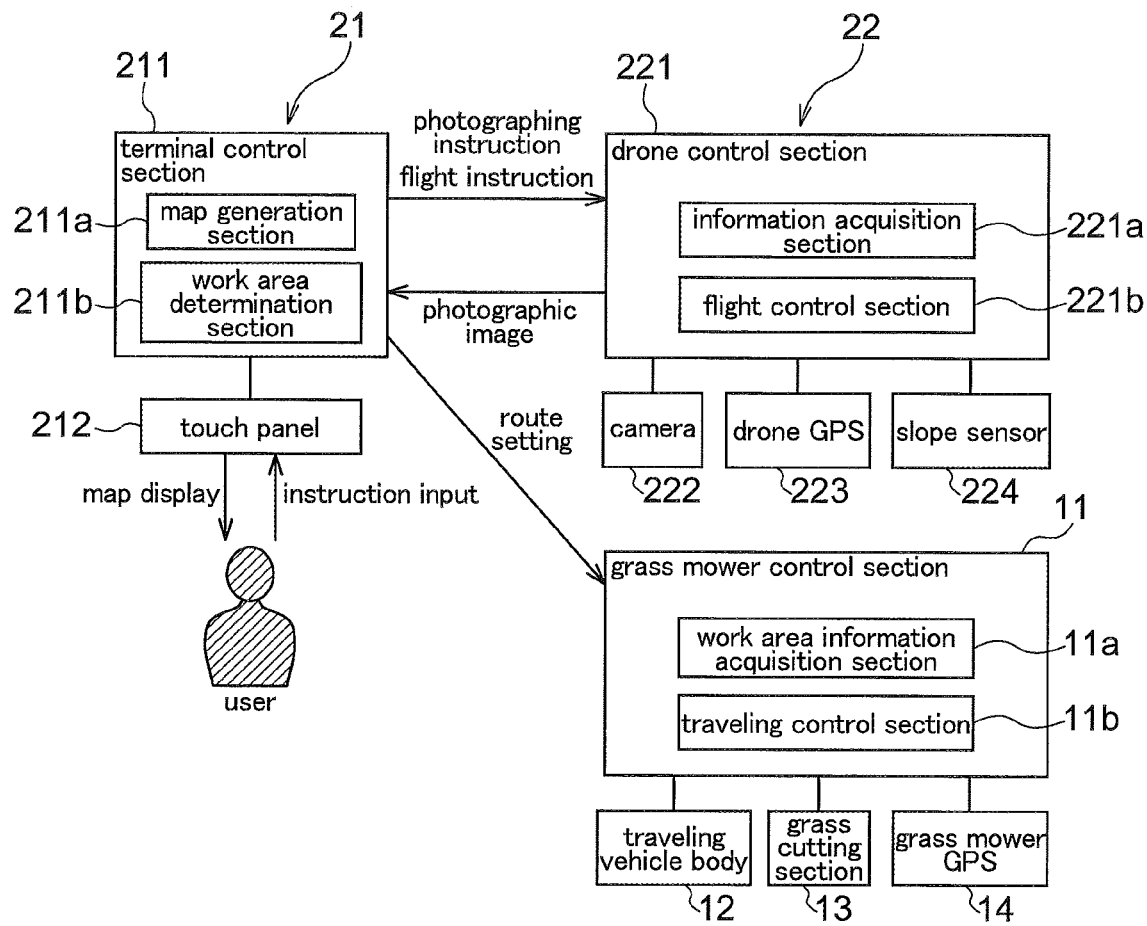
FIG. 3 is a view showing relationship among respective constituting elements in the first embodiment of the work area determination system relating to the present invention.

In FIGS. 1 and 2, where was shown an example wherein a single flag 111 is provided. However, the invention it not limited to such arrangement. A plurality of indices may be installed. In case a plurality of indices are provided, preferably, an arrangement that allows mutual distinction between/among the respective indices, such as coloring thereof with different colors, will be provided. Further, it will be more preferable if the number and installing positions of the indices are set so as to allow all photographic images to show at least one index respectively, since this will improve the accuracy of the synthesis of photographic image.

In regards other arrangements too, it should be understood that the embodiments disclosed in this are only exemplary and the scope of the invention is not limited thereto. It will be readily understood that one skilled in the art would arrive at various modifications within a scope not departing from the essence of the present invention. Therefore, other embodiments with such modifications made within a scope not departing from the essence of the present invention are construed to be encompassed also within the scope of the present invention as a matter of course.

INDUSTRIAL APPLICABILITY

The present invention can be used as a work area determination system of an autonomous traveling work vehicle for instance.

The invention claimed is:

1. A work area determination system for an autonomous traveling work vehicle, comprising:
   a photographing device for photographing a predetermined area including a work area and acquiring a plurality of photographic images thereof, the plurality of photographic images containing an index positioned in the work area;
   a positioning device for obtaining position information indicative of a position at which each of the plurality of photographic images has been acquired;
   a map generation section for generating a map by synthesizing the plurality of photographic images based on a position of the index in each of the plurality of photographic images and the position information indicative of the position at which each of the plurality of photographic images has been acquired;
   a displaying section for displaying the map; and
   a work area determination section for determining the work area in which the autonomous traveling work vehicle is to work while an exclusion area is excluded automatically, based on an area designation for the map displayed in the displaying section.

2. The work area determination system of claim 1, wherein the photographing device includes a slope sensor, and slope information of the photographing device at the time of photographing of the plurality of photographic images is added to the plurality of photographic images.

3. The work area determination system of claim 1, further comprising an unmanned flying body; and wherein the photographing device and the positioning device are mounted on the unmanned flying body.

4. The work area determination system of claim 1, further comprising an elongate stick member; and wherein the photographing device and the positioning device are mounted on the elongate stick member.

5. An autonomous traveling work vehicle comprising:
   a traveling vehicle body;
   a positioning device for acquiring self-vehicle position information indicative of a self-vehicle position;
   a work area information acquisition section for acquiring work area information indicative of a work area; and
   a traveling control section for controlling traveling of the traveling vehicle body based on the self-vehicle position information and the work area information such that the traveling vehicle body travels within the work area;
   wherein the work area information acquisition section acquires the work area information determined by an area designation for a map generated while an exclusion area is excluded automatically by synthesizing a plurality of photographic images of a predetermined area including the work area, the plurality of photographic images containing an index positioned in the work area, wherein the synthesizing of the plurality of photographic images is based on a position of the index in each of the plurality of photographic images and position information indicative of a position at which each of the plurality of photographic images has been acquired.

6. A computer program product for determining a work area for an autonomous traveling work vehicle, the computer program product comprising at least one non-transitory computer-readable medium including one or more instructions that, when executed by at least one processor, cause the at least one processor to:
   acquire a plurality of photographic images photographed by a photographing device of a predetermined area including a work area, the plurality of photographic images containing an index positioned in the work area;
   acquire position information indicative of a position where each of the plurality of photographic images was acquired;
   generate a map by synthesizing the plurality of photographic images based on a position of the index in each of the plurality of photographic images and the position information indicative of the position at which each of the plurality of photographic images has been acquired;
   display the map in a displaying section; and
   determine the work area where the autonomous traveling work vehicle is to work while an exclusion area is excluded automatically, based on an area designation for the map displayed by the displaying function.

* * * * *

UNITED STATES PATENT AND TRADEMARK OFFICE
CERTIFICATE OF CORRECTION

PATENT NO.        : 10,656,653 B2
APPLICATION NO.   : 15/993917
DATED             : May 19, 2020
INVENTOR(S)       : Katsuhiko Uemura et al.

It is certified that error appears in the above-identified patent and that said Letters Patent is hereby corrected as shown below:

Column 8, Line 5, Claim 5, after "vehicle" insert -- , --

Signed and Sealed this
Eighteenth Day of August, 2020

Andrei Iancu
*Director of the United States Patent and Trademark Office*